United States Patent [19]

Wiedrich et al.

[11] Patent Number: 5,427,748
[45] Date of Patent: Jun. 27, 1995

[54] CHEMICAL FEEDER

[75] Inventors: Charles R. Wiedrich, Murrysville; Gerard F. Dooley, Wexford, both of Pa.

[73] Assignee: PPG Industries, Inc., Pittsburgh, Pa.

[21] Appl. No.: 231,005

[22] Filed: Apr. 21, 1994

[51] Int. Cl.⁶ .................... B01D 11/02; E04H 3/16; E03B 11/00; B65D 88/54
[52] U.S. Cl. .................... 422/264; 422/261; 422/266; 422/272; 422/274; 422/277; 210/97; 210/169; 210/206; 137/268; 222/325
[58] Field of Search ............. 422/261, 263, 264, 265, 422/266, 272, 274, 275, 276, 277; 210/97, 169, 206, 754, 756; 137/268; 222/321, 325

[56] References Cited

U.S. PATENT DOCUMENTS

| | | | |
|---|---|---|---|
| 1,242,905 | 10/1917 | Atkinson | 422/274 |
| 2,395,258 | 2/1946 | Drake | 422/261 |
| 3,864,090 | 2/1975 | Richards | 422/278 |
| 4,379,125 | 4/1983 | Benninger et al. | 422/274 |
| 4,790,981 | 12/1988 | Mayer et al. | 422/263 |
| 4,816,222 | 3/1989 | Fagrell | 422/261 |

Primary Examiner—Robert J. Warden
Assistant Examiner—Christopher Y. Kim
Attorney, Agent, or Firm—Irwin M. Stein

[57] ABSTRACT

Described is a chemical feeder comprising a housing having a base and upwardly extending side walls that define a cavity for containing solid chemical material, e.g., calcium hypochlorite. A hollow coaxial chamber is located within the cavity and is seated on the base. The side walls of the chamber are spaced from the side walls of the housing, thereby to define an annular collection zone. A grid having a plurality of perforations covers the hollow coaxial chamber and has a flange associated with the edge of the grid, the perimeter of the flange being adjacent to, or close to but spaced from, the walls of the housing, thereby to permit liquid communication between the portion of the housing cavity above the grid with the collection zone. An inlet conduit is used to supply dissolving liquid to the hollow chamber. An outlet conduit from the annular collection zone to outside the housing wall removes liquid solution of solid chemical material from the collection zone. A valve connected to the inlet conduit controls the flow rate of dissolving liquid to the hollow chamber.

24 Claims, 5 Drawing Sheets

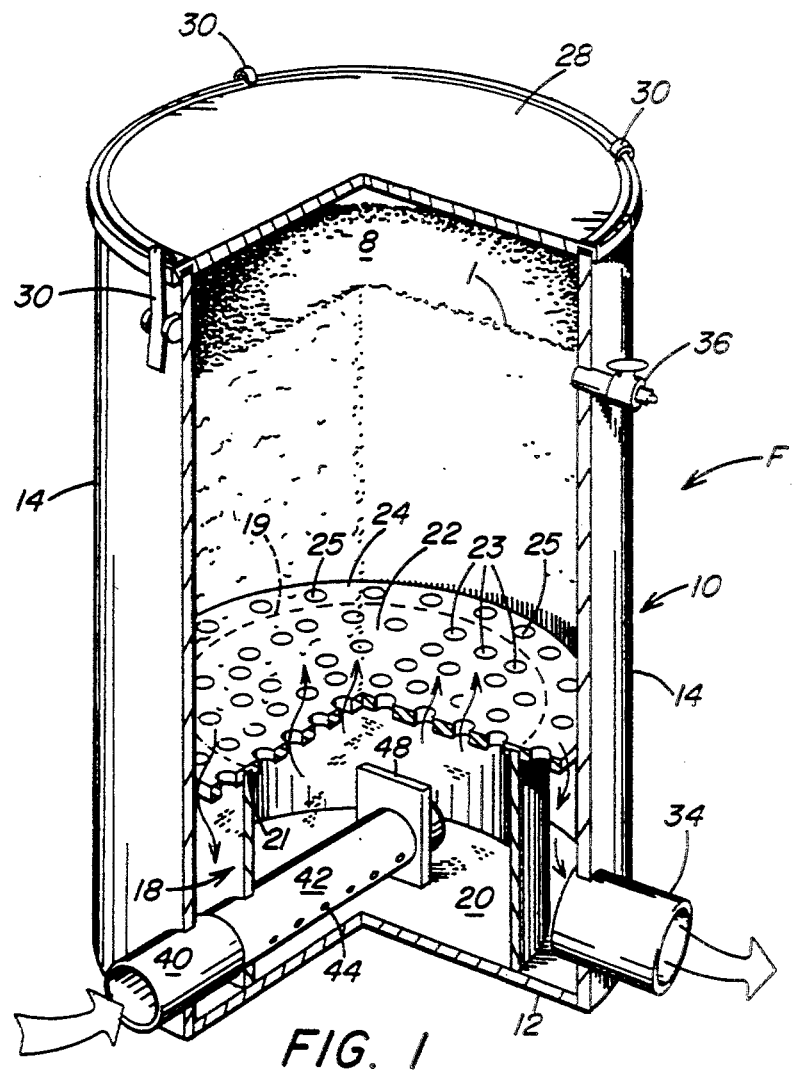
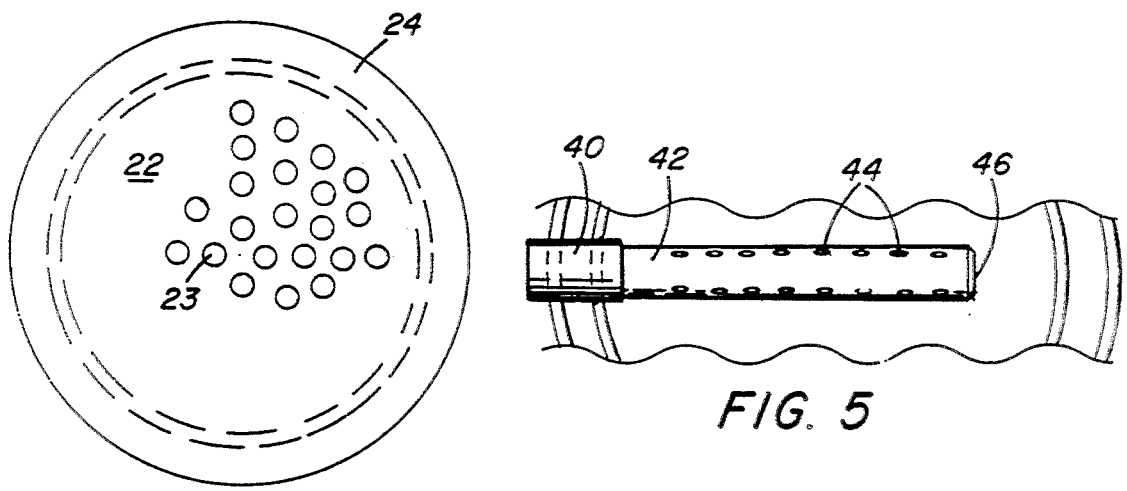
FIG. 1
FIG. 4
FIG. 5

CHEMICAL FEEDER

DESCRIPTION OF THE INVENTION

The present invention is directed generally to apparatus for dissolving a solid chemical material in a liquid in which the chemical is soluble. More particularly, the present invention concerns a chemical feeder for delivering an aqueous solution of a chemical material, e.g., nutrient chemicals, sanitizing chemicals, dechlorination chemicals, and pH control chemicals, to a location, e.g., a large body of water, where it is to be dispensed. Still more particularly, the present invention is directed to a chemical feeder that automatically dispenses controlled amounts of an aqueous solution of sanitizing chemical, e.g., calcium hypochlorite, in a reliable, efficient and cost effective manner for treatment of water systems. In a method of operating the chemical feeder of the present invention, the solubilizing liquid, e.g., water, is brought into controlled contact with a solid form of the chemical material in a dissolving zone such that it is dissolved in the liquid in a controlled manner. Thereafter, the resulting solution of solid chemical material flows from the dissolving zone to a collection zone within the apparatus from where it flows out of the apparatus to the location where it is to be dispensed.

Chemical feeders used in previous forced flow or circulation systems have certain common features. Some typically have a chamber in which dissolving of the solid chemical occurs, and a chemical retainer in which the solid chemical is placed. The dissolving liquid, normally water, is typically fed into the dissolving chamber by some controlled means to ensure that the proper amount of chemical is dissolved.

U.S. Pat. No. 5,089,127 describes a chemical feed apparatus for dispensing a solid sanitizing agent, such as calcium hypochlorite, into a closed water circulation system, such as a flowloop for swimming pools. This apparatus provides an arrangement of parts including a canister containing tablets of a solid chemical sanitizing material, the lower portion of which is located in a cup-like dissolving reservoir. The lower portion and bottom of the canister is perforated to allow contact between water and the solid chemical sanitizing material. The solution of sanitizing material flows over the rim of the cup-like dissolving reservoir into a collection chamber from whence the solution is dispensed.

While the chemical feeder described in U.S. Pat. No. 5,089,127 provides an effective continuous feed of sanitizing agent, e.g., calcium hypochlorite, to bodies of water, e.g., swimming pools, for an extended period of unattended operation, the volume of water that may be treated for that period of unattended operation is limited by the number of sanitizing chemical tablets with which the canister may be filled. For example, a 20,000–40,000 gallon (75.7–151.4 m$^3$) swimming pool may be treated for a week or more by the chemical feed apparatus described in U.S. Pat. No. 5,089,127 without the addition of additional tablets of sanitizing material to the feeder. However, for larger bodies of water and water systems requiring the continuous addition of a sanitizing chemical over prolonged periods, e.g., water treatment plants, potable water supplies, industrial waste water, run-off water, water systems for cooling towers, and the like, a modified chemical feeder from that described in U.S. Pat. No. 5,089,127 is required if frequent recharging of the canister with tablets of solid sanitizing agent is to be avoided.

In accordance with the foregoing requirements and pursuant to the present invention, there is provided an apparatus comprising a housing having a base member and upwardly extending side walls. The base member and side walls define a cavity within the lower portion of which is located a chamber that is fixed to said base member of the housing. The chamber has side walls which may be also affixed to said base member and which are spaced from the side walls of the housing. The proximity of the chamber side walls to the housing side walls may vary, i.e., in one embodiment, the chamber side walls may be close to but spaced from the housing side walls, or in a second embodiment may be spaced from the housing side walls. The space between the walls of the chamber and the walls of the housing form an annular collection zone.

A grid structure, i.e., sieve plate means, containing a plurality of perforations, is mounted atop the chamber, the grid resting on and being supported by the chamber side walls, thereby forming a hollow space within the chamber into which dissolving liquid may be charged. The grid is substantially parallel to the base member and in the above-described second embodiment may have flange means extending from the upper terminus of the side walls of the chamber to a location that is adjacent to, or which is close to but spaced slightly from, the inside side walls of the housing. The flange means, when present, the inside side walls of said housing and the outside side walls of the chamber form an annular space or cavity which serve as a collection zone for the solution of solid chemical formed in the dissolving zone above the grid. A cap or cover may be placed over the housing.

The grid structure (including the flange when present) divides the housing into an upper storage compartment and a lower compartment containing the annular collection zone and the chamber. The outside edge of the grid or the flange when present, is in close proximity to the side walls of said housing, i.e., adjacent to, or close to but spaced slightly from the side walls of the housing, to permit the flow of liquid from the dissolving zone in the lower section of the upper storage compartment to the annular collection zone. Thus the upper storage compartment and the collection zone in the lower compartment are in liquid communication with one another. Means, e.g., piping means, is provided for delivering dissolving liquid, e.g., water, to the chamber within the housing, and means, e.g., piping means, is provided additionally to remove the solution of solid chemical from the collection zone.

The features that characterize the present invention are pointed out with particularity in the claims which are annexed to and form a part of this disclosure. Those and other features of the invention, its operating advantages and the specific objects obtained by its use will be more fully understood from the following detailed description and the accompanying drawings in which preferred embodiments of the invention are illustrated and described, and in which like reference characters designate corresponding parts.

BRIEF DESCRIPTION OF THE DRAWINGS

FIG. 1 is a partially cut away isometric view of an embodiment of the chemical feeder of the present invention;

FIG. 4 is a top plan view of the grid of FIG. 2, in which the perforations in the flange have been deleted;

FIG. 5 is a bottom view of pipe means for delivering liquid to the chamber below the grid;

DETAILED DESCRIPTION OF THE INVENTION

Figure 2:
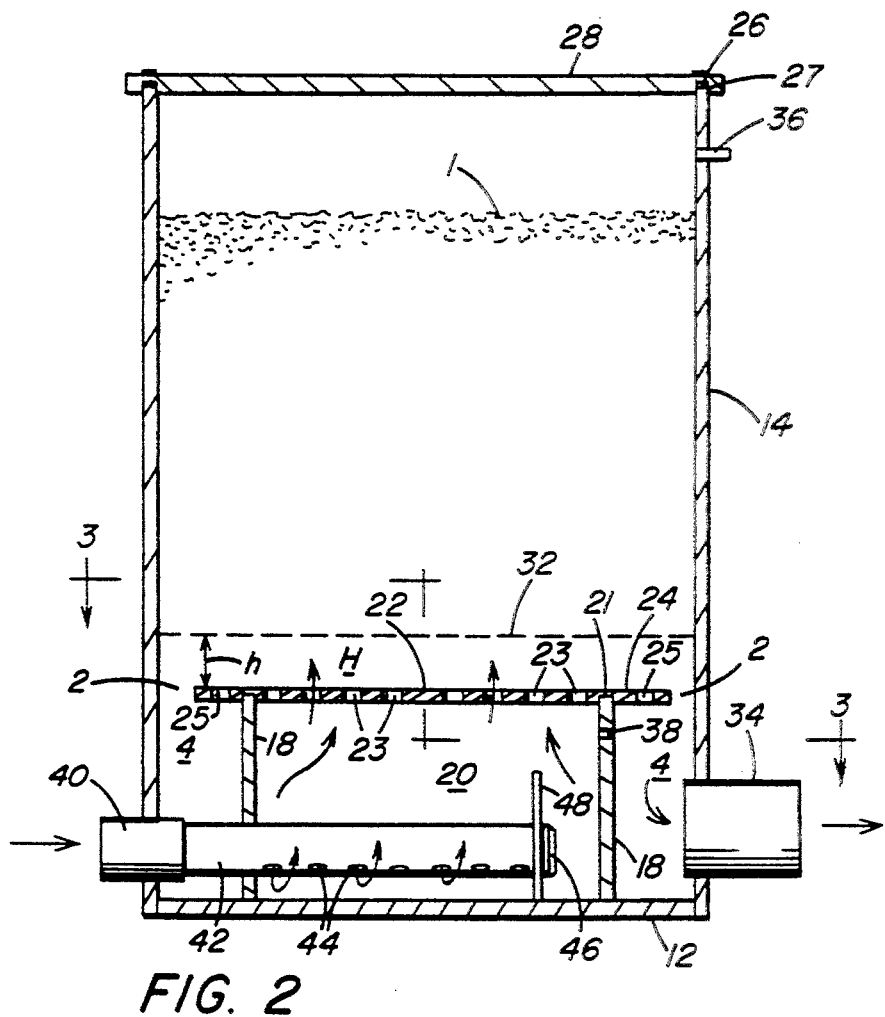
FIG. 2 is an elevation view, partially in section, of the chemical feeder of FIG. 1.
Figure 3:
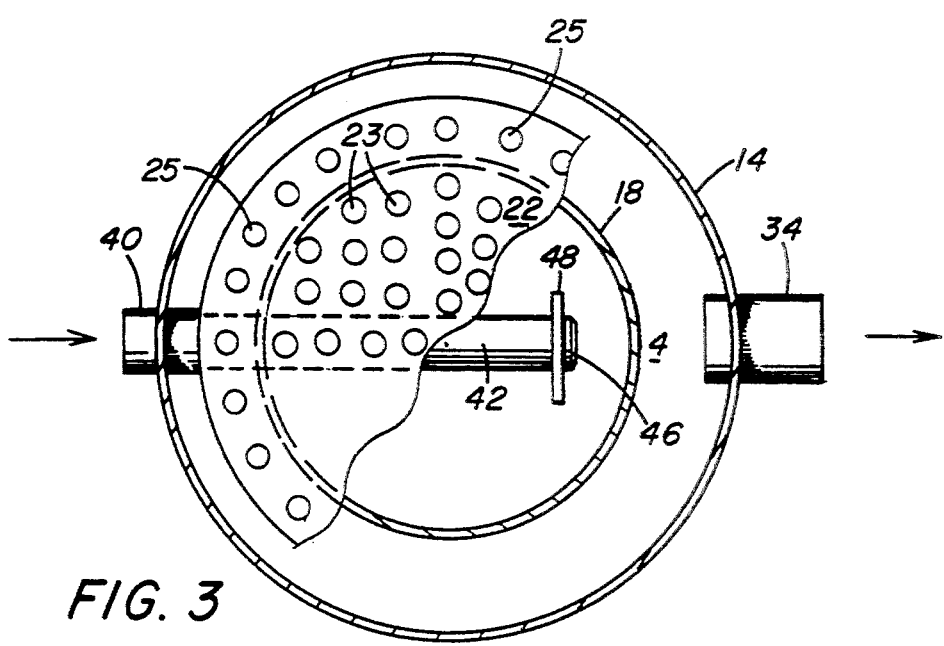
FIG. 3 is a top plan view of the chemical feeder of FIG. 2 through section line 3—3.

Referring now to FIGS. 1, 2 and 3 of the drawings, the feeder F comprises a housing 10 having a base member 12 and upwardly extending side walls 14. As shown, side walls 14 of housing 10 are substantially vertical and perpendicular to base member 12. Housing 10 may be of any appropriate geometric shape, e.g., cylindrical, eliptical or square shaped. Side walls 14 and base member 12 typically define a cavity which, in the embodiment of FIG. 1, may be characterized as a hollow cylinder. Within the cavity of housing 10 is a hollow chamber 20 having side walls 18, which are affixed to base member 12, as shown in FIG. 2. In the embodiment shown in FIG. 10, chamber 20 is formed from side walls 18 and a separate base member 16, which rests on and is attached to base member 12 of the housing. Side walls 18 of chamber 20 are spaced from the side walls 14 of housing 10, thereby to define an annular space or cavity identified herein as collection zone 4. While hollow chamber 20 may be of any appropriate geometric shape, it is typically of the same geometry as the housing, e.g., cylindrical in shape and coaxial with housing 10 when the housing also is cylindrical.

Referring again to FIGS. 1 and 2, the upper end of housing 10 is covered with removable lid 28. As shown, lid 28 has an annular channel 27 near its outside edge, which is sized to be slightly larger than the thickness of side wall 14 so as to fit over the top of side wall 14 of housing 10. An O-ring 26 is located in annular channel 27 so that when the lid is placed on top of housing 10 and forced downwardly by latches 30, the interior of upper storage compartment 8 of housing 10 is sealed against the entry of contaminants and the outside air. Lid 28 may be secured in place by means of hinged latches 30, which when in place provide an airtight seal between the lid and the upper terminus of side walls 14. Although the number of latches 30 used may vary, at least two such latches are contemplated, i.e., two latches 180° apart. Three or four (or more) latches equally spaced around top 28 and housing 10 may be used, i.e., spaced 120° or 90° apart.

While the use of a top secured by latches is shown, it is clear that other means of attachment, such as a threaded cap, may be used. Since the feeder may be operated with a negative pressure in the storage compartment 8, it generally is not necessary to secure lid 28 to housing 10, except as a safety measure to prevent unauthorized or accidental entry.

In another embodiment, cover 28 may have a handle, e.g., a centrally located handle, on its top side and an inner annular leg that fits closely against the inside side wall of housing 10. The annular leg need not be continuous, but may comprise a plurality of legs extending downwardly from the bottom of cover 28 that are biased toward the inside side wall 14 so as to exert a compressive force against the wall to keep the lid in place during operation of the feeder.

Grid 22 in the form of a sieve plate having a plurality of perforations 23 is mounted on top of the side walls 18 of chamber 20, thereby forming a hollow space into which dissolving liquid may be introduced. The grid is spaced from and substantially parallel to base member 12. As shown, the grid (and hence the chamber) is located in said housing below the midpoint of the horizontal axis of said housing, thereby dividing the cavity within the housing into a major upper storage compartment 8 for the storage of solid chemical material 1, and a minor lower compartment comprising the collection zone 4 and chamber 20. The grid will typically have the same geometric shape as chamber 20, e.g., square, rectangular, eliptical or circular. As shown in more detail in FIG. 3, grid 22 is a circular plate having a plurality of perforations 23. The grid has a circular channel 21 on its bottom surface to mate with the cylindrical walls 18 of chamber 20. The grid is held in place by the weight of the solid chemical material 1 charged to the storage compartment of the feeder.

As shown in FIGS. 3 and 4, the grid has a plurality of openings 23 to allow the passage of dissolving liquid from chamber 20 into the dissolving zone indicated by the letter "H" in FIG. 2 to contact the solid chemical material 1. The openings may be of any suitable geometric shape, e.g., circular, rectangular, triangular, square, eliptical, etc., and should be sufficiently small, vis-a-vis, the size of the solid chemical material, which may be in the form of granules, pellets, or tablets (large and small), e.g., 0.375 inch (0.95 cm) up to 5 inches (12.7 cm), e.g., 1 inch (2.54 cm) to 3 inches (7.62 cm) in diameter. Powdered chemical material is not typically used because powder would more easily flow through the perforations of the grid and have a tendency to plug the chamber and perforations, especially in the event of an interruption in feeder operation. In addition, when the solid chemical material 1 is very hygroscopic the use of a granular form of the chemical may also not be suitable for the same reasons.

As shown in FIGS. 3 and 4, the perforations are circular and spaced evenly on the grid. Typically, the circular perforations, as shown, may vary from 0.25 to 3 inches (0.64 cm to 7.62 cm), e.g., 1.25 inch (3.2 cm) in diameter. The number of perforations, their size and the total open area represented by the perforations are designed to avoid the build-up of pressure in chamber 20 by the dissolving liquid and to avoid jetting of the dissolving liquid into the dissolving zone—although a billowing or a welling-up of the dissolving liquid into the dissolving zone typically results during operation of the feeder. In the case of a jetting dissolving liquid, the dissolution of the chemical 1 in the dissolving zone is uneven; whereas a welling-up of the dissolving liquid results in a substantially uniform dissolution of the solid chemical above the grid plate in the dissolution zone.

As shown by dotted line 19 in FIG. 1 and in FIGS. 3 and 4, there is shown flange means 24, which is an extension of grid 22. Flange 24 extends beyond the side walls of the chamber toward the inside side wall of housing 10. The perimeter of flange 24 is shown as being close to but spaced from the inside side wall 14 of housing 10 to allow passage of the solution of the solid chemical material from the dissolving zone H to the annular collection zone 4. The distance of the perimeter of flange 24 from the inside of side wall 14 of housing 10 may vary, but, typically will range from about 0.25 to 1 inch (0.64–2.54 cm), more typically from 0.5 to 0.75 inch (1.27–1.91 cm). The flange may be solid, as shown in FIG. 4, but may also have perforations 25 like grid 22, which perforations also serve to allow liquid communication between the dissolving zone and the collection cavity or zone 4. When the flange is solid it will be spaced from the side wall of housing 10; however, when the flange contains perforations it may be spaced from the side wall of housing 10 or be adjacent to, e.g., in contact with, the wall. The sieve plate and flange may be a continuous flat plate that is prepared from one piece of flat sheet stock.

Figure 10:
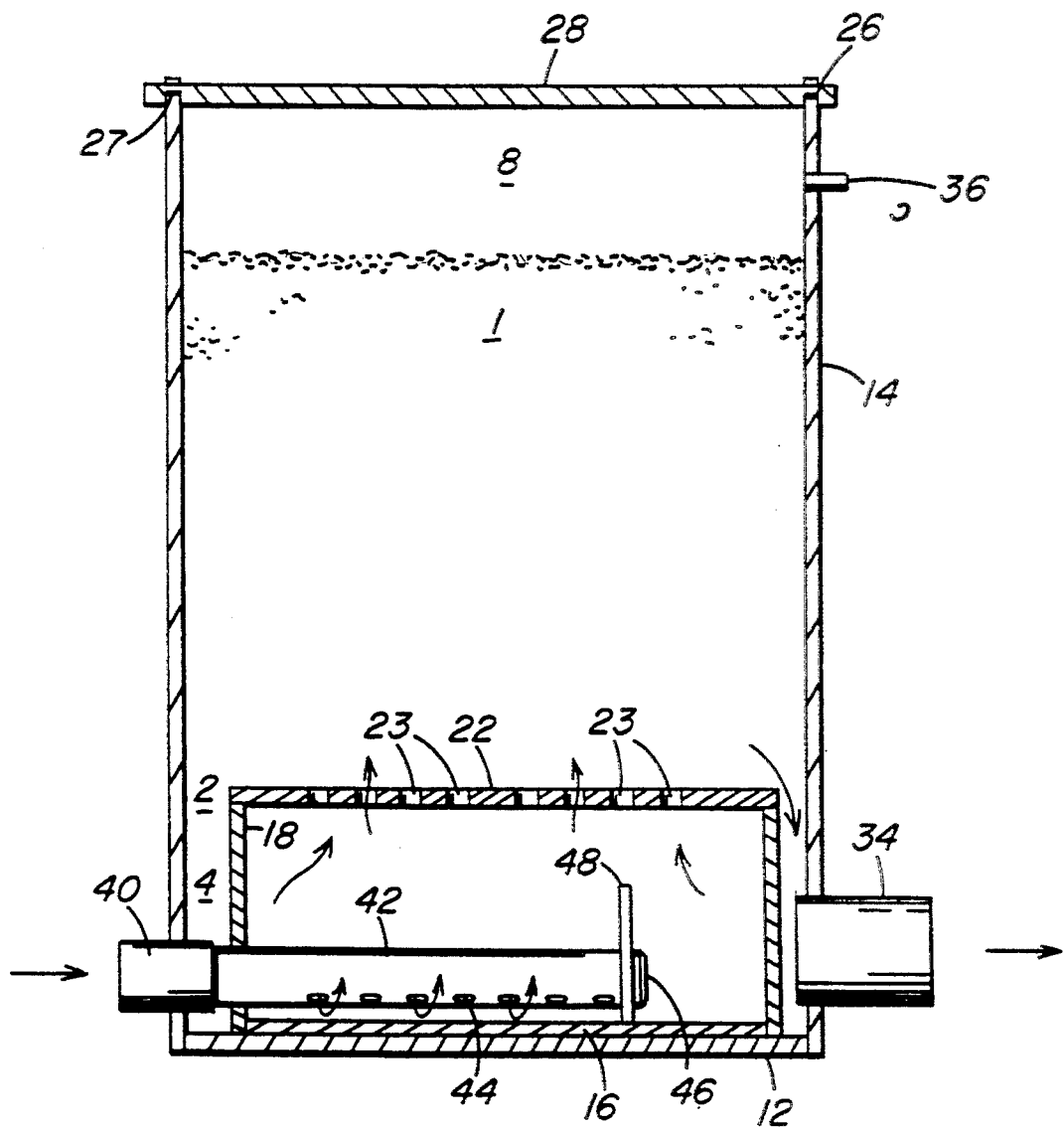
FIG. 10 is an elevation view, partially in section, of a chemical feeder similar to FIG. 1 except that the grid has no flange and the sidewalls of the chamber below the grid are near the inner side walls of the housing.

In the embodiment of FIG. 10, the grid has no flange and the side walls of the chamber 20 are spaced from the inside side walls 14 of housing 10. The distance that the side walls of chamber 20 are removed from the walls of housing 10, i.e., annular space 2, is similar to that described above with respect to the perimeter of flange 24.

The perforations in the flange may be smaller or larger in size than the perforations 23 in the grid. Such perforations serve to assist in regulating the volume of liquid flowing into collection zone 4. The shape of the perforations in flange 24 may vary in geometric shape like the perforations in the grid and may include notches along the edge of the flange, e.g., triangular, square or semi-circular notches.

The annular opening 2 between the housing walls 14 and the perimeter of the flange 24 (or the walls 18 of chamber 20 in FIG. 10), as well as the size of the perforations, if any, in the flange surface can be selected to regulate the volume and flow rate of liquid that passes into the collection zone. The annular opening 2 (and the openings in the flange, if any) is designed to avoid the build-up of liquid above the dissolving zone in storage compartment 8 over the operating range of the feeder, i.e., to accommodate the maximum flow contemplated of liquid into chamber 20. The diameter of the outflow discharge means 34 also will assist in the avoidance of build-up of liquid above the dissolving zone in the storage compartment 8.

Figure 6:
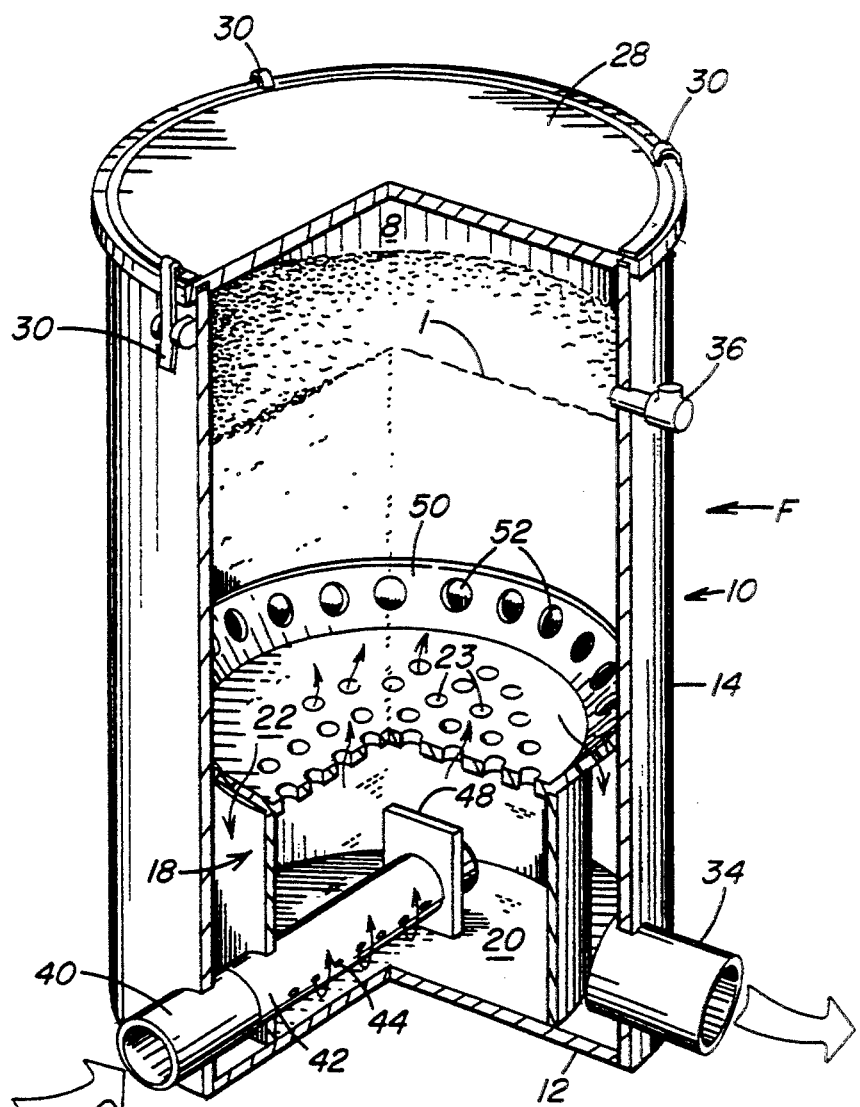
FIG. 6 is a partially cut away isometric view of a further embodiment of the chemical feeder of the present invention wherein the flange associated with the grid is sloped in an upward direction.
Figure 7:
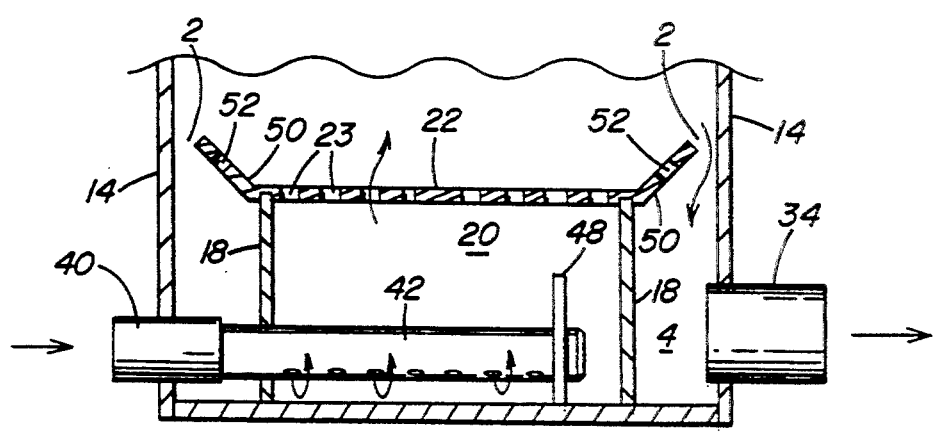
FIG. 7 is an elevation view partially in section of the lower section of the chemical feeder of FIG. 6.

Referring to FIGS. 6 and 7, there is shown grid 22 and flange 50 having a plurality of circular perforations 52. The flange 50 is shown disposed in an upwardly direction slanted away from grid 22 and toward the walls 14 of housing 10. Flange 50 as shown may be adjacent to, e.g., in contact with, or spaced from side wall 14. If flange 50 is solid, it will be spaced from side wall 14. The under surface of flange 52 typically forms an acute angle with the horizontal plane of the grid; however, the angle could be a right angle. Such angle may vary widely, e.g., between 10° and 75°, more usually from 30° to 60°, such as 45°. Broadly, the angle that the flange 50 forms with the horizontal plane of the grid may vary from 0° to 90°. The discussion with respect to the number, size and shape of perforations 25 also applies to perforations 52.

Figure 8:
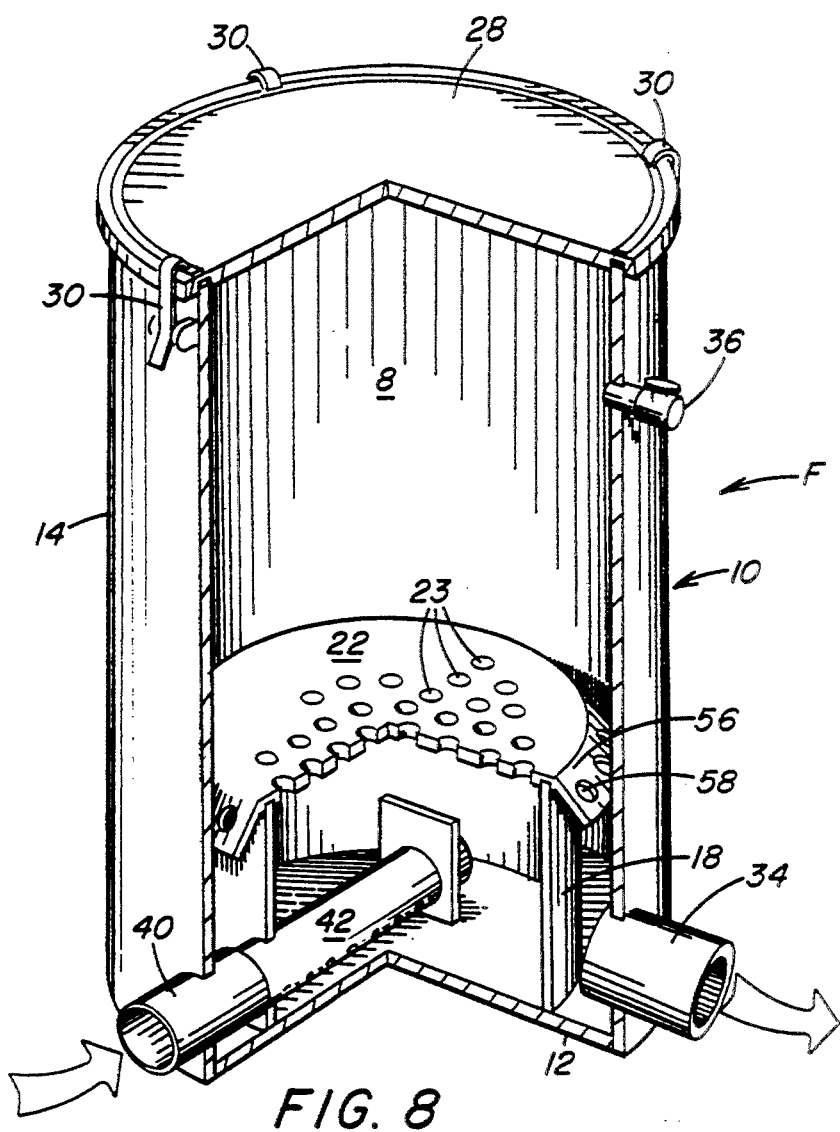
FIG. 8 is a partially cut away isometric view of a further embodiment of the chemical feeder of the present invention wherein the flange associated with the grid is sloped in a downward direction.
Figure 9:
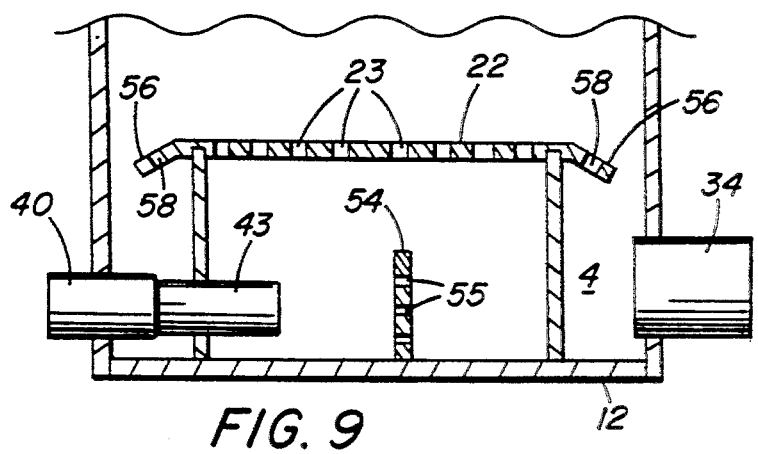
FIG. 9 is an elevation view, partially in section, of the chemical feeder of FIG. 8.

Referring to FIGS. 8 and 9, there is shown grid 22 and flange 56 having a plurality of circular perforations 58. Flange 56 is shown disposed in a downwardly direction slanted away from grid 22 toward the walls 14 of housing 10. The upper top surface of flange 56 forms an acute angle with the horizontal plane of grid 22. Such angle may vary widely, e.g., between 10° and 75°, more usually from 30° to 60°, such as 45°. The discussion with respect to the number, size and shape of perforations 25 also applies to perforations 58. The discussion with respect to the position of the perimeter of flange 50, vis-a-vis, wall 14, also applies to flange 56.

As shown in FIG. 2, dotted line 32 represents the water level within upper storage compartment 8 during feeder operation. The housing inside diameter [or diameter of the grid (flange)] and height h above grid 22 define the volume of dissolving zone H. The height h of the dissolving zone is typically a maximum of about 2 inches (5.08 cm), but can vary depending on the area of the perforations in the flange, if any, the area of the annular opening 2, and the rate of dissolving liquid charged to chamber 20. The height h of the dissolving zone H may vary, i.e., increase with increasing rates of dissolving liquid charged to the chamber. Most desirably, the surface area of solid chemical 1 in contact with the dissolving liquid in the dissolving zone should remain substantially constant during operation of the feeder.

Means to deliver liquid to chamber 20 are provided by an inlet conduit 40 and pipe 42 which, in combination, are shown extending through one side of side wall 14 of housing 10 and side wall 18 of chamber 20. Inlet pipe 42 is shown as extending to near the opposite inside wall 14 of chamber 20 and as having a plurality of orifices 44, i.e., in the form of a sparger pipe, to allow the passage of dissolving liquid, e.g., water, from its source (not shown) into chamber 20. Orifices 44 are shown facing downwardly toward base member 12. In one contemplated embodiment, pipe 42 has two rows of orifices 44 each offset 15 degrees from the vertical, i.e., so that the rows are 30° apart. Such an arrangement allows the incoming fluid from inlet pipe 42 to flow into chamber 20 toward base member 12, whereupon it rises through chamber 20 and passes substantially uniformly through the perforations 23 in grid 22. While distribution means in the form of a sparger pipe is shown, any means of dispersing liquid within chamber 20 may be used. Inlet pipe 42 may be plugged with a plug 46, it may be covered with a cap, or it may extend and be attached to the opposite side wall 18 of the chamber. The distal end of inlet pipe 42 may be supported by leg 48 which rests upon base member 12. Leg 48 may be in the form of a saddle attached to the bottom and sides of pipe 42. Alternatively, a cap (not shown) and leg 48 may be the same part, i.e., a cap and saddle support means.

Additionally, as shown in FIG. 9, the means to deliver liquid to the chamber 20 may comprise an inlet conduit 40 and open ended pipe 43. The liquid from pipe 43 may be discharged against and/or through baffle means 54 so as to more evenly distribute the liquid within chamber 20, thereby providing a more even flow of liquid upwardly through grid 22, and permitting substantially uniform dissolution of the solid chemical material 1 along the top surface of grid 22 and in the dissolving zone H above the grid Openings 55 in baffle means 54 permit liquid to flow through the baffle.

The purpose of baffle means 54 is to more evenly distribute dissolving liquid entering chamber 20 within that chamber to obtain substantially uniform fluid flow upwardly through grid 22, thereby to provide substantially uniform dissolution of the solid chemical material 1 within dissolving zone H. Baffle means 54 may be one or more baffles, may extend across the entire diameter or width of chamber 20, or extend only partially across the width of the chamber, i.e., be placed in the path of the incoming liquid entering from pipe 43. The height of baffle 54 is such that the top of the baffle is slightly higher than the top surface of inlet pipe 43. Baffle means 54 may be solid, have a series of small openings 55, as shown in FIG. 9, or have other larger openings, e.g., triangular or rectangular openings in the baffle, to permit the flow of liquid through the baffle. The means for using baffles to distribute fluid within a chamber from an inlet conduit is known in the art and need not be described in detail herein.

Liquid flowing upwardly through grid 22 dissolves solid chemical material 1 in dissolving zone H essentially occupying a volume defined by the area of grid 22 and a height h, as shown in FIG. 2. The resulting solution of chemical material passes through the annular opening 2 and the perforations 25 in the flange 24, if any, into collection zone 4 and is subsequently removed from the collection zone through outlet conduit 34. While one exit conduit is shown, there may be additional exit conduits provided in housing 10 to allow for the removal of additional chemical solution or to provide for access to chamber 20 for ease of installing piping or to provide for multiple different applications of the chemical solution.

The feeder may be operated at atmospheric or subtmospheric pressures. A vacuum relief valve 36 may be provided in the housing side wall, e.g, in storage compartment 8, which valve communicates with the atmosphere. As shown, in FIG. 1 valve 36 provides the means for releasing vacuum within the feeder F (when it is operated under vacuum) so that cover 28 may be removed.

In operation and with particular reference to FIG. 1, upper storage compartment 8 is filled with solid chemical material 1, e.g., sanitizing agent such as calcium hypochlorite pellets, tablets or the like. The size of the solid chemical material will be sufficiently large to bridge the perforations 23 and 25 in grid 22 and flange 24 respectively. Typically, the solid chemical material will range in size from about 0.375 inch (0.95 cm) to 5 inches (12.7 cm). Solid chemical material that may fall through the perforations in the grid and flange into chamber 20 or into collection zone 4, either because of their original size or because they become too small due to erosion, will be dissolved by the liquid in chamber 20 (or the collection zone) and the resulting solution will ultimately pass upwardly through grid 22 and out into the collection zone 4, and subsequently out of the discharge outlet pipe 34. Typically, storage compartment 8 may be sized to hold from about 1 pound (0.45 kg) to about 2000 pounds (907 kg) of chemical material 1, preferably from about 20 to 750 pounds (9.1 to 340 kg), more preferably from about 150 to 550 pounds (68 kg to 249 kg).

The liquid to be treated, usually a side stream from a main liquid, e.g., water, flow loop, is forwarded to inlet conduit 40 of the feeder. The rate of flow into conduit 40 is regulated by valve means (not shown) in piping connected to the inlet conduit. Dissolving liquid, usually water, flows into inlet pipe 42 and exits through orifices 44 into chamber 20. The liquid rises through and fills chamber 20, and subsequently passes through grid 22 by means of perforations 23 in the grid and contacts the solid chemical material 1. Dissolving liquid rises in the upper compartment 8 to a height h defining the dissolving zone H. The chemical material, e.g., sanitizing agent, is dissolved in the liquid and the resulting solution passes out of upper compartment 8 through openings 25 and annular space 2 into collection zone 4. The level of water in upper compartment 8 may be increased (and hence the amount of sanitizing agent dissolved increased) by increasing the delivery rate of dissolving liquid into chamber 20. The solution of solid chemical material in collection zone 4 is withdrawn through outlet conduit 34 and returned to the main flow loop of the dissolving liquid.

The feeder works on the principle of constant contact between the solid chemical material and the dissolving liquid in a dissolving zone comprising the liquid volume above the grid 22. The amount of chemical material delivered to the liquid to be treated is varied by controlling the flow rate of dissolving liquid that contacts and dissolves the chemical material within the dissolving zone and the volume of dissolving liquid in contact with the chemical material in the dissolving zone. As the lowermost solid chemical material, e.g., sanitizing agent, in the dissolving zone is dissipated, additional chemical material moves in a downward direction under the influence of gravity onto the perforated grid 22. When no dissolving liquid is delivered to the feeder or the delivery of such liquid to the chamber is cut off, no dissolution of solid chemical material occurs since there is then no contact between the solid chemical and the dissolving liquid—any liquid in the dissolving zone having fallen into the collection cavity 4 when delivery of liquid to chamber 20 is stopped.

If a solenoid valve is used in the dissolving liquid inlet feed line, it is possible for the level of dissolving liquid to remain in the dissolving zone, e.g., at the same level as during operation of the feeder. In that case, as shown in FIG. 2, a small opening 38 is provided to allow fluid communication between collection zone 4 and chamber 20, thereby to permit the liquid level in the dissolving zone to drain into chamber 20 and thence into the collection zone.

The feeder is relatively inexpensive to construct and maintain since it has no moving parts other than the inlet valve, which can be any valve capable of regulating the flow of liquid between about 0 and about 200 gallons per minute (0–0.76 m$^3$/min), e.g., 0.5 or 5 to 100 gallons per minute (0.0019 or 0.019 to 0.38 m$^3$/min) and the check and vacuum relief valves. The feeder and the valves may be fabricated from any suitable material that is chemically and corrosion resistant to the solid chemical material 1, such as for example, polyethylene, ABS (acrylonitrile-butadiene-styrene resin), fiberglass reinforced resins, polystyrene, polypropylene, poly(vinyl chloride), chlorinated poly(vinyl chloride) or any other material that is chemically resistant to the solid chemical being dispensed, e.g., a sanitizing agent such as calcium hypochlorite. Other materials such as stainless steel may also be used, but the use of such material would result in a substantial increase in cost. In a preferred embodiment, the feeder is fabricated from poly(vinyl chloride) (PVC), which is generally chemically resistant to water sanitizing chemicals, such as calcium hypochlorite. Plastic parts of the feeder may be made by injection or rotation molding.

When constructed of plastic resin material, the various parts of the feeder may be joined by solvent or heat welding or by threading. The inlet and outlet conduits may also be joined to the feeder by the use of conventional bulkhead fittings. If a metal, such as stainless steel is used, conventional welding of the parts may be used to fabricate the feeder. Alternatively, the parts of the feeder may be joined by conventional threaded bolts and appropriate gasketing to insure that the feeder is water-tight.

The solid chemical material that may be used with the feeder may be any chemical that is solid at ambient conditions of temperature and pressure (STP), which may be formed into pellets or tablets, and which is readily soluble in a flowing liquid, e.g., water, at STP conditions. Examples of such chemicals can be nutrients, e.g., fertilizers; sanitizing agents, e.g., chemicals that sanitize water, such as for example, calcium hypochlorite, bromo-chloro hydantoin, dichlorohydantoin and chloroisocyanurates; desanitizing (dechlorination) agents such as sodium sulfite, sodium metabisulfite, sodium bisulfite, sodium thiosulfate, sodium sulfhydrate (NaSH), and sodium sulfide ($Na_2S$); and pH control agents such as sodium bisulfate, citric acid, sodium carbonate, sodium bicarbonate and quaternary ammonium compounds, some of which may be used also as algaecides.

It will be readily appreciated by those skilled in the art that the feeder of the present invention can be integrated into liquid, e.g., water, treatment facilities by appropriate piping connected with the inlet conduit 40 and outlet conduit 34. The feeder may be integrated into an open or closed system. For example, inlet conduit 40 may be connected to a by-pass line of a main liquid, e.g., water, conduit by appropriate piping, thereby providing a source of liquid for treatment. The solution of chemical material removed through outlet conduit 34 is forwarded by appropriate piping to the main liquid conduit downstream of the by-pass line connection. Alternatively, if the fluid flow in the main liquid conduit can be handled directly by the feeder, the feeder may be connected in-line with the main liquid conduit.

In another embodiment, the feeder may be installed in a closed system wherein the by-pass line from the main liquid conduit is connected by appropriate piping to the discharge side of a suitable pump. For example, the feeder may be used to treat swimming pool water by charging water discharged from the pool to the suction side of a pump. A by-pass flow line is connected to the main flow line connected to the discharge side of the pump and feeds water to the inlet conduit 40 of feeder F which is charged with solid chemical sanitizing agent. The aqueous solution of sanitizing agent removed through outlet conduit 34 is forwarded to the main flow line on the suction side of the pump. Chemically treated water passes through the pump and is forwarded to the swimming pool where it mixes with the main body of water in the pool. The amount of chemically treated water recirculated to the feeder through the by-pass line on the pressure (discharge) side of the pump is minimal because of dilution in the main feed lines and has no effect on the operation of the overall system because the rate and volume of water passing through the feeder prevents the water from becoming saturated with the chemical sanitizing agent.

The present invention is more particularly described in the following example, which is intended as illustrative only, since numerous modifications and variations therein will be apparent to those skilled in the art.

EXAMPLE

A chemical feeder of the type described in FIGS. 1 and 2 (except as noted herein) using the inlet pipe 42 of FIG. 5 was prepared using Schedule 40 poly(vinyl chloride) pipe and 0.5 inch (1.27 cm) poly(vinyl chloride) sheet stock. The nominal inside diameter of chamber 20 was 11.75 inches (29.85 cm) and was six inches (15.24 cm) in height. The nominal outside diameter of housing 10 was 18.75 inches (47.53 cm) and was 26 inches (66.04 cm) in height. The nominal inside diameter of housing 10 was 17.25 inches (43.82 cm) Grid plate 22 and flange 24 were fabricated from one piece of 0.5 inch (1.27 cm) poly(vinyl chloride) sheet stock and had a diameter of 16 inches (40.64 cm). Grid 22 was machined with 34 holes of 1.25 inch (3.18 cm) diameter drilled on about 1.75 inch (4.45 cm) centers within a 9.75 inch (24.77 cm) diameter circle. The flange 24 was solid (unperforated). Grid plate 22 had a one inch (2.54 cm) wide channel on its underside to fit onto the wall 18 of chamber 20, as illustrated in FIG. 2. The annular space 2 between the outside perimeter of the flange and the inside of the housing side wall was 0.63 inches (1.59 cm). The base member 12 was welded to the inside of the housing side wall to be watertight. The side walls 18 of chamber 20 were welded to the base member.

The sparger pipe 42 was fabricated from about 1.5 inch (3.81 cm) Schedule 40 PVC pipe and was 13.5 inches (34.29 cm) in length. The openings (orifices) in the sparger pipe faced downwardly toward the base member 12 and were located in two rows, each row having 4 orifices. Each row was offset 15 degrees from the vertical so that the rows were 30 degrees apart.

Sparger pipe 42 was connected to a 1.5 inch (3.81 cm) Schedule 40 PVC inlet coupling welded to the inside wall of the housing. The outlet conduit was connected to a three inch (7.62 cm) Schedule 40 PVC outlet coupling welded to the inside of the housing wall and cut flush inside. The other side of the outlet coupling had male threads. The center of the inlet and outlet couplings were located three inches (7.52 cm) above the base member.

The feeder was placed on a platform balance installed on a scaffold at a height of approximately 5 feet (1.5 meter) adjacent to a 10,000 gallon (37.8 $m^3$) above-ground vinyl-lined pool having the dimensions 12 feet (3.66 meter)×32 feet (9.75 meter)×4 feet (1.22 meter). The feeder inlet was connected to the pressure-side of a Jacuzzi Magnum 2000 (EM-2000) pool pump equipped with a 2-horsepower motor, using a section of 2 inch (5.08 cm) flexible poly(vinyl chloride) hose fitted to a Rotometer flowmeter having a range of 10–130 gallons per minute (0.038–0.492 $m^3$/min) with 2 inch (5.08 cm) inlet and outlet fittings.

The outlet from the feeder was returned to the test pool by gravity through a 4 inch (10.16 cm) rigid poly(vinyl chloride) pipe. The pump drew water from the pool to the suction side of the pump and forced the water through the flow meter into the feeder.

The feeder was filled with about 60 pounds (27.3 kg) of 3 inch (7.62 cm) calcium hypochlorite tablets produced by PPG Industries, Inc. and having 65% minimum available chlorine in each tablet. The flow rate of water through the feeder was varied from 15 to 60 gallons (0.06–0.23 m³/min) per minute. Weights were recorded before and after the feeder was charged with the calcium hypochlorite tablets, as well as after the desired flow rate had been established and at appropriate intervals throughout the experiment. Delivery rates were calculated from the measured weight losses and time intervals. The data obtained is tabulated in Table 1.

TABLE 1

| Water Flow Rate** (gpm) | Chlorine Delivered,* (lb/Hr) | Calcium Hypochlorite Tablets used (lb/Day) |
|---|---|---|
| 15 | 0.25 | 9.27 |
| 30 | 1.23 | 45.38 |
| 45 | 3.00 | 110.73+ |
| 60 | 5.47 | 201.86+ |

*0.65 × weight loss/time
**A rotometer flowmeter having a range of 10–130 GPM was used for this flowrate.
+ Calculated values; normalized to pounds/day Although the present invention has been described with reference to specific details of certain preferred embodiments thereof, it is not intended that such details should be regarded as limitations upon the scope of the invention except as to the extent that they are included in the accompanying claims.

We claim:

1. Apparatus for dissolving and delivering a solution of a solid chemical material comprising a housing having a base member and upwardly extending side walls, said base member and side walls defining a cavity, a chamber having side walls within the lower portion of said cavity, the bottom of the side walls of said chamber being adjacent to said base member and the side walls of said chamber being spaced from the side walls of the housing, thereby forming an annular cavity grid plate means mounted atop the chamber, said grid being substantially parallel to the base member, means to deliver liquid in which said solid chemical material is soluble to said chamber, and means to remove solution of said chemical material from said annular cavity.

2. The apparatus of claim 1 wherein said grid has flange means extending from the upper terminus of the side walls of the chamber to a location adjacent to or close to but spaced from the side walls of the housing.

3. The apparatus of claim 2 wherein said flange means is solid and extends to a location close to but spaced from the side walls of the housing.

4. The apparatus of claim 2 wherein said flange means contains perforations.

5. The apparatus of claim 4 wherein said flange means is adjacent to the housing side walls.

6. The apparatus of claim 4 wherein the perforations in the flange are from 0.25 to 3 inches in diameter.

7. The apparatus of claim 2 wherein the flange means is disposed in an upwardly direction slanted away from the grid toward the housing side walls.

8. The apparatus of claim 7 wherein the under surface of the flange forms an acute angle of between 10° and 75° with the horizontal plane of the grid.

9. The apparatus of claim 2 wherein the grid plate contains a plurality of evenly spaced circular perforations.

10. The apparatus of claim 9 wherein the circular perforations in the grid are from 0.25 to 3 inches in diameter.

11. The apparatus of claim 1 wherein the side walls of the chamber are spaced from the housing side walls a distance of from about 0.25 inch to about 1 inch.

12. The apparatus of claim 1 wherein the grid plate contains a plurality of perforations having a size and total open are sufficient to avoid the build up of pressure in the chamber by the solubilizing liquid and to provide substantially uniform dissolution of the solid chemical material above the grid plate.

13. Apparatus for dissolving and delivering a solution of a solid satirizing agent comprising a substantially cylindrical housing having a base member and upwardly extending side walls, said base member and side walls defining a cavity, a substantially circular chamber having side walls within the lower portion of said cavity, the bottom of the side walls of said chamber being adjacent to said base member, the side walls of the chamber being spaced from the side walls of the housing, thereby forming an annular cavity, sieve plate means mounted atop the chamber, said sieve plate being substantially parallel to the base member, piping means to deliver liquid in which the sanitizing agent is soluble to said chamber, and piping means to remove a solution of said sanitizing agent from said annular cavity.

14. The apparatus of claim 13 wherein said sieve plate has flange means extending from the upper terminus of the side walls of the chamber to a location adjacent to or close to but spaced from the side walls of the housing.

15. The apparatus of claim 14 wherein said flange means is solid and is close to but spaced from the housing side walls.

16. The apparatus of claim 15 wherein the sieve plate and flange are one continuous flat plate.

17. The apparatus of claim 16 wherein the flange is spaced from about 0.25 to about 1 inch from the housing side wall.

18. The apparatus of claim 14 wherein said flange means contains perforations.

19. The apparatus of claim 18 wherein said flange means is adjacent to the housing side walls.

20. The apparatus of claim 18 wherein said flange means is spaced from about 0.25 to about 1 inch from the housing side wall.

21. The apparatus of claim 18 wherein the perforations in the flange means are from 0.25 to 3 inches in diameter.

22. The apparatus of claim 14 wherein the sieve plate contains a plurality of evenly spaced circular perforations.

23. The apparatus of claim 22 wherein the circular perforations in the sieve plate are from 0.25 to 3 inches in diameter.

24. The apparatus of claim 13 wherein the sieve plate contains a plurality of perforations having a size and total open area sufficient to avoid the build up of pressure in the chamber by the solubilizing liquid and to provide substantially uniform dissolution of the solid sanitizing agent above the sieve plate.

* * * * *